United States Patent Office 3,374,210
Patented Mar. 19, 1968

3,374,210
SULFONATED AROMATIC RESINS
N. William Muller, Clarendon Hills, Ill., and Harlan E. Tarbell, Elizabethton, Tenn., assignors, by mesne assignments, to Grefco, Inc., Philadelphia, Pa., a corporation of Delaware
No Drawing. Filed Sept. 20, 1965, Ser. No. 488,763
11 Claims. (Cl. 260—79.3)

ABSTRACT OF THE DISCLOSURE

Flame retarding sulfonated polyaromatic resins containing from 0.5 to 18% by weight of combined sulfuric acid, are prepared by adding gradually, with mixing, to a molten or dissolved PR resin, a solution of a sulfonating agent in an inert liquid which is preferably a lower mononitroalkane, and heating the mixture at 60° to 160° C. until all the sulfonating agent has reacted. The weight ratio of the sulfonated agent to the solvent should be within 3:2 to 1:2.

PR resins are asphalt-like residues containing a large proportion of polynuclear aromatic compounds, obtained from catalytic or thermal cracking of naphthas having an A.P.I. gravity of 40 to 60, to a product that is predominantly ethylene.

---

This invention relates to sulfonated bituminoid aromatic resins and to a process for preparing them. More particularly, it relates to the reaction of sulfonating agents with polynuclear aromatic resins obtained as residual by-products in the cracking of light hydrocarbons to compounds that are gaseous under standard temperature and pressure conditions.

In a specific embodiment illustrating the process that gives rise to the materials that can be sulfonated according to this invention, a crude petroleum naphtha having an A.P.I. gravity of between 40 and 60, is separated from natural gas by a process such as scrubbing, and is converted to ethylene by cracking in a known manner. The cracking operation can be either thermal or catalytic. In thermal cracking, the naphtha feed is introduced into a tube still heater maintained at relatively low pressures and at a temperature of about 800° C., where cracking occurs in the presence of steam. The main product, ethylene, and a few other lightweight olefinic gases are separated from the residue and are subjected to further separation and purification steps. In catalytic cracking, lower temperatures are made possible by the carrying out of the reaction in the presence of a catalyst such as chromic acid deposited on bauxite, orthophosphoric acid or any other appropriate catalyst. In either process, a highly aromatic residual by-product is obtained. This by-product is topped, if necessary, to yield a glossy, dark brown or black pitch-like material having the following properties:

|  | Broad | Preferred |
| --- | --- | --- |
| Benzene solubles, percent | 80–100 | 92–100 |
| Pentane solubles, percent | 20–50 | 25–45 |
| Sulfur, percent | 0.1–1.0 | 0.2–0.7 |
| Conradson carbon, percent | 20–60 | 30–50 |
| Specific gravity | 1.15–1.25 | 1.15–1.25 |
| Softening point, °C | 40–65 | 45–60 |

The resins may be further characterized by the fact that they are distillable to the extent of about 40% by weight at temperatures up to 360° C. and under reduced pressure (ASTM D–20). This distillate, as indicated by gas chromatography, is composed substantially of polynuclear aromatic compounds such as fluorene, phenanthrene, pyrene, chrysene, alkyl homologs of these compounds and alkyl naphthalenes.

It is known of course that a Lewis acid, i.e. a compound or element capable of accepting electrons, will render an organic compound self-extinguishing and that sulfuric acid as well as other sulfonating agents are widely used in this capacity. There have been published in this respect numerous methods for the sulfonation of a great variety of organic compounds. For instance, aromatic resins such as polystyrene may be sulfonated readily with 1.84 S.G. sulfuric acid but the products are expensive and do not possess the physical properties of the bitumens. The sulfonation of mixtures of compounds, on the other hand, presents greater difficulties. In the field of petroleum, for instance, where one often deals with complex mixtures of many types of hydrocarbons of often unknown composition and of extreme variation in ease of sulfonation from highly reactive to inert, the sulfonation process is rather empirical in nature. Thus, bituminous materials such as asphalt do not easily react with Lewis acid formers such as chlorine, phosphoric acid, sulfuric acid, and so on or when they do react, they tend to form unstable compounds. When viewed in the light of this experience, the prospects of obtaining useful and stable compounds by sulfonating the cracking process residual by-products that have already been described seem rather unpromising. After all, these by-products resins appear and behave very much like asphalts with respect to such important identifying and functional characteristics such as color, texture, softening point, viscosity, penetrating power, handling properties and durability.

The principal object of this invention, therefore, is the sulfonation of these by-products resins with a view to produce useful self-extinguishing coating and adhesive preparations.

This and other objects which will become apparent upon familiarization with the detailed description of the invention, have been accomplished by subjecting the resin, melted or dissolved, to the action of a sulfonating agent such as sulfuric acid dissolved in an inert solvent. The process is carried out at moderate heat until the sulfonating agent has reacted completely with the resin. There is thus produced an improved material which increases the compatibility with asphalt and is self-extinguishing to the extent that it will impart this valuable property to asphalt even when mixed with said asphalt in amounts such that the mixture contains as little as 1% by weight of reacted sulfuric acid.

The following examples will clearly illustrate the invention but are not to be construed however as limitations thereof.

Example 1

PR resin, 1000 parts by weight, was heated to 130° C. in a reaction kettle equipped with a condenser. A solution of 20 parts of 1.84 S.G. sulfuric acid in 20 parts nitromethane was added to the stirring resin within a period of 1 minute. The resulting mixture was held at 130° C. for 30 minutes. The condenser was removed. The reaction mixture was then heated at 150° C. for an additional period of 30 minutes to insure the complete removal and recovery of the solvent.

The sulfonated material thus obtained was homogenous in that it showed no solid particles when dissolved in dioxane and filtered. The material proved to be self-extinguishing on removal from an open Bunsen burner flame. It retained this property when mixed with as much equal parts by weight of asphalt.

The particular PR resin used in this example was a Monsanto Company product having the following original characteristics:

| | |
|---|---|
| Benzene solubles percent | 98 |
| Pentane solubles do | 35 |
| Sulfur do | 0.384 |
| Conradson carbon do | 40 |
| Specific gravity | 1.175 |
| Softening point ° F | 120 to 130 |
| Total distillate to 360° C. percent | 41.28 |

This distillate consisted substantially of, in order of decreasing amount: dimethylnaphthalene, phenanthrene, alkyl phenanthrenes, fluorene, methylfluorene, ethylfluorene, pyrene, chrysene and diphenyl.

*Example 2*

An aromatic polynuclear resin, 1000 parts by weight, was dissolved in a mixture of 100° F. flash point VM & P naphtha, 100 parts, and trichloroethylene, 100 parts, and was heated to 120° C. in a reaction kettle equipped with a condenser. Commercial concentrated sulfuric acid, 40 parts, in nitrobenzene, 60 parts, was then added gradually over a period of 2 minutes. The mixture was held at 125° C. for 1 hour and neutralized with commercial concentrated ammonium hydroxide, 40 parts. The volatiles were removed. A smooth homogeneous product was obtained which proved to be self-extinguishing on testing.

The resin employed had the following characteristics:

| | |
|---|---|
| Benzene solubles percent | 93.2 |
| Sulfur do | 0.26 |
| Conradson carbon do | 36.5 |
| Specific gravity | 1.180 |
| Softening point ° C | 45 |
| Total distillate at 360° C. percent | 44.3 |

The distillate consisted substantially of, in order of decreasing amount: methylphenanthrene, fluorene, fluoranthrene, methylfluorene, phenanthrene, anthracene, pyrene, benzafluorene, biphenylene oxide, acenaphthene, alkyl naphthalenes and chrysene.

*Example 3*

The resin of Example 1, 1000 parts by weight, was dissolved in a mixture of 100° F. flash point VM & P naphtha, 100 parts, and trichloroethylene, 100 parts, and was heated to 120° C. in a reaction kettle equipped with a condenser. Commercial concentrated sulfuric acid, 80 parts, was then added gradually over a period of 10 minutes. The mixture was held at 115 to 125° C. for 1 hour and was neutralized with commercial concentrated ammonium hydroxide, 40 parts. The product after removal of volatiles was found to be self-extinguishing on testing in an open Bunsen burner flame. It did not have much practical value however because of the presence of hard gritty lumps which were found to dissolve only in concentrated sulfuric acid.

*Example 4*

The resin of Example 1, 1000 parts by weight, was heated to 100° C. in a reaction kettle. Commercial concentrated sulfuric acid, 80 parts, was added with stirring within the period of 1 minute. The material was held at 110 to 120° C. for 1 hour. The resulting resin contained some hard dioxane insoluble material which was found to be self-extinguishing immediately upon removal from an open flame. The dioxane soluble fraction of the product, on the other hand, was not self-extinguishing. The product therefore was not usable for the applications contemplated.

*Example 5*

Paperboard was soaked in a solution containing 10% urea and 5% dibasic ammonium phosphate, and dried. The paper was then coated with the sulfonated resin of Example 1. The resulting product was found to be self-extinguishing. A similar product made from the same treated paperboard with unsulfonated resin continued to burn upon removal from flame.

The resins that can be used in the practice of the present invention have already been described. They can be caused to react, as demonstrated, with various quantities of sulfonating agent, said agent being of course a member of the class consisting of sulfuric acid, sulfur trioxide, oleum and chlorosulfonic acid. Preferably, the sulfonated product may contain from 0.5 to about 18% by weight of the sulfonating agent, although it has been found that a sulfuric acid content of 2 to 8% by weight based on the polyaromatic resin is sufficient for most contemplated uses.

The reaction is preferably carried out at temperatures within the range of 60 to 160° C. Prior to the addition of the sulfonating agent, the resin is softened by melting, dissolving in a solvent, or by both processes. The solvents that can be used here need not dissolve the sulfonating agent although they should be substantially inert to such agents. The organic liquids preferred for this function, in addition to those that are used to dilute the sulfonating agent, are those belonging to the class consisting of alkanes and halogenated alkanes. These solvents may be employed in any amount considered necessary to facilitate the thorough dispersion of the sulfonating agent throughout the resin mass.

Of crucial importance, on the other hand, is the solvent which must be used to dilute the sulfonating agent. This liquid must be fairly polar and yet substantially inert in order to be able to mix with concentrated sulfuric acid and not react with it to any detrimental extent. Very few organic liquids meet such stringent demands and the favored among these are the lower mono-nitroalkanes, such as nitromethane and nitroethane. Although it has not been found necessary to remove the sulfonating agent solvent from the reaction products before they are further compounded and used, solvents are preferred which have a boiling point not higher than about 150° C. so that they may evaporate easily on ultimate application of the sulfonated resin to a substrate. Higher boiling solvents such as nitrobenzene and nitrotoluene may of course be used but they are preferably removed by distillation when removal is desired. The preferred weight ratio of sulfonating agent to solvent has been found to be about 1:1 in the case of sulfuric acid and nitromethane. A higher ratio may be employed surely as illustrated by Example 2, but it must be considered that a point is reached where the sulfonating agent concentration is sufficiently large to cause the formation of the lumpy hard substance that renders the product undesirable. The concentration limit varies to some extent with the particular resin batch being treated; it is believed, however, that a range of sulfonating agent to solvent ratio of about 3:2 to 1:2 adequately covers the practical concentrations that can be used and satisfactorily defines the limits of the invention if construed according to the spirit in which it is established. Higher contents of solvent may be used as well but this does not serve any essential purpose.

The sulfonated resins may or may not be neutralized before use. When neutralization is indicated, ammonium hydroxide has been found satisfactory; it does not affect the self-extinguishing properties of the resins.

The products of this invention are highly useful as flame-retardants by themselves and in a variety of solutions, dispersions and emulsions. They behave like bitumens and thus can be employed in lieu of bitumens or with bitumens in the majority of applications open to this class of materials, e.g. in such products as moldings, roofing materials, tarpapers and adhesives. As substitute for bitumens, they possess the advantage that the active flame-retarding agent, the sulfonate group, is chemically bound on and throughout the bituminoid material and therefore remains locked into place until needed for protection against fire. This excellent combination of properties will surely suggest to those skilled in the art many other uses for the sulfonated resins of this invention.

What is claimed is:

1. A process for the production of a sulfonated aromatic resin which comprises
   (1) adding a solution of a sulfonating agent in a substantially inert polar liquid to a bituminoid polyaromatic resin which is the residual by-product of the catalytic cracking of a petroleum hydrocarbon mixture selected from the group consisting of crude oils and petroleum naththas having an API gravity of at least 40, refinery gases and low boiling lightweight paraffinic and aromatic gases, said by-product containing from 30 to 50% by weight of polynuclear aromatic hydrocarbons vacuum distillable within the range of 267 to 360° C., and being characterized further by the following properties:

| | |
|---|---|
| Benzene solubles _____ percent by weight__ | 80 to 100 |
| Pentane solubles _____do____ | 20 to 50 |
| Sulfur _____do____ | 0.1 to 1.0 |
| Conradson carbon _____do____ | 20 to 60 |
| Specific gravity _____ | 1.15 to 1.25 |
| Softening point _____degrees centigrade__ | 40 to 65 | and
   (2) heating the resulting mixture until the sulfonating agent has reacted with the resin.

2. A process as in claim 1 wherein the polyaromatic resin also is dissolved in a substantially inert liquid before the addition of the sulfonating agent solution.

3. A process as in claim 2 wherein the substantially inert liquid is selected from the group consisting of saturated aliphatic hydrocarbons, chlorinated hydrocarbons, mono-nitrated hydrocarbons or mixtures thereof.

4. A process as in claim 1 wherein the polyaromatic resin is heated to a temperature within the range of 60 to 160° C. before the addition of the sulfonating agent solution.

5. A process as in claim 1 wherein the mixture of sulfonating agent, solvent and polyaromatic resin is heated at a temperature not exceeding 160° C. until all the components are thoroughly intermixed.

6. A process as in claim 1 wherein the sulfonating agent is selected from the group consisting of sulfuric acid, oleum, sulfur trioxide and chlorosulfonic acid.

7. A process as in claim 6 wherein 2 to 8% of sulfuric acid, based on the weight of polyaromatic resin, is used.

8. A process as in claim 7 wherein the sulfuric acid is dissolved in a solvent selected from the mono-nitroalkanes having a boiling point of up to about 150° C., the resulting solution having a sulfuric acid-solvent weight ratio within the range of about 3:2 to 1:2.

9. A process as in claim 1 wherein 0.5 to 18% of the sulfonating agent, based on the weight of polyaromatic resin, is used.

10. A sulfonated polyaromatic resin containing on a weight basis .05 to 18% combined sulfonate groups calculated as sulfuric acid, said resin being originally the residual by-product of the catalytic cracking of a petroleum hydrocarbon mixture selected from the group consisting of crude oils and petroleum naphthas having an API gravity of at least 40, refinery gases and low boiling lightweight paraffinic and aromatic gases, said by-product containing from 30 to 50% by weight polynuclear aromatic hydrocarbons vacuum distillable within the range of 267 to 360° C. comprising substantially fluorene, phenanthrene, pyrene, chrysene, their alkyl homoologs and alkyl naphthalenes; said residue being characterized further by the following properties:

| | |
|---|---|
| Benzene soluble _____percent by weight__ | 80 to 100 |
| Pentane soluble _____do____ | 20 to 50 |
| Sulfur _____do____ | 0.1 to 1.0 |
| Conradson carbon _____do____ | 20 to 60 |
| Specific gravity _____ | 1.15 to 1.25 |
| Softening point _____degrees centigrade__ | 40 to 65 |

11. A process as in claim 1 wherein the substantially inert polar liquid which dissolves the sulfonating agent is selected from the class consisting of mononitro substituted lower alkanes, mononitro substituted aromatic hydrocarbons and mixtures thereof.

References Cited

UNITED STATES PATENTS 2,872,437   2/1959   Gilbert et al. _____ 260—79.3
3,056,765   10/1962  Cowherd et al. _____ 260—79.3

JOSEPH L. SCHOFER, *Primary Examiner.*

D. K. DENENBERG, *Assistant Examiner.*